Aug. 21, 1928.

C. H. HAPGOOD 1,681,640

HEAT REGULATOR

Filed May 2, 1925    5 Sheets-Sheet 1

Inventor
CLARENCE H. HAPGOOD.

By Rex Frye.
Attorney

Aug. 21, 1928.
C. H. HAPGOOD
1,681,640
HEAT REGULATOR
Filed May 2, 1925    5 Sheets-Sheet 2
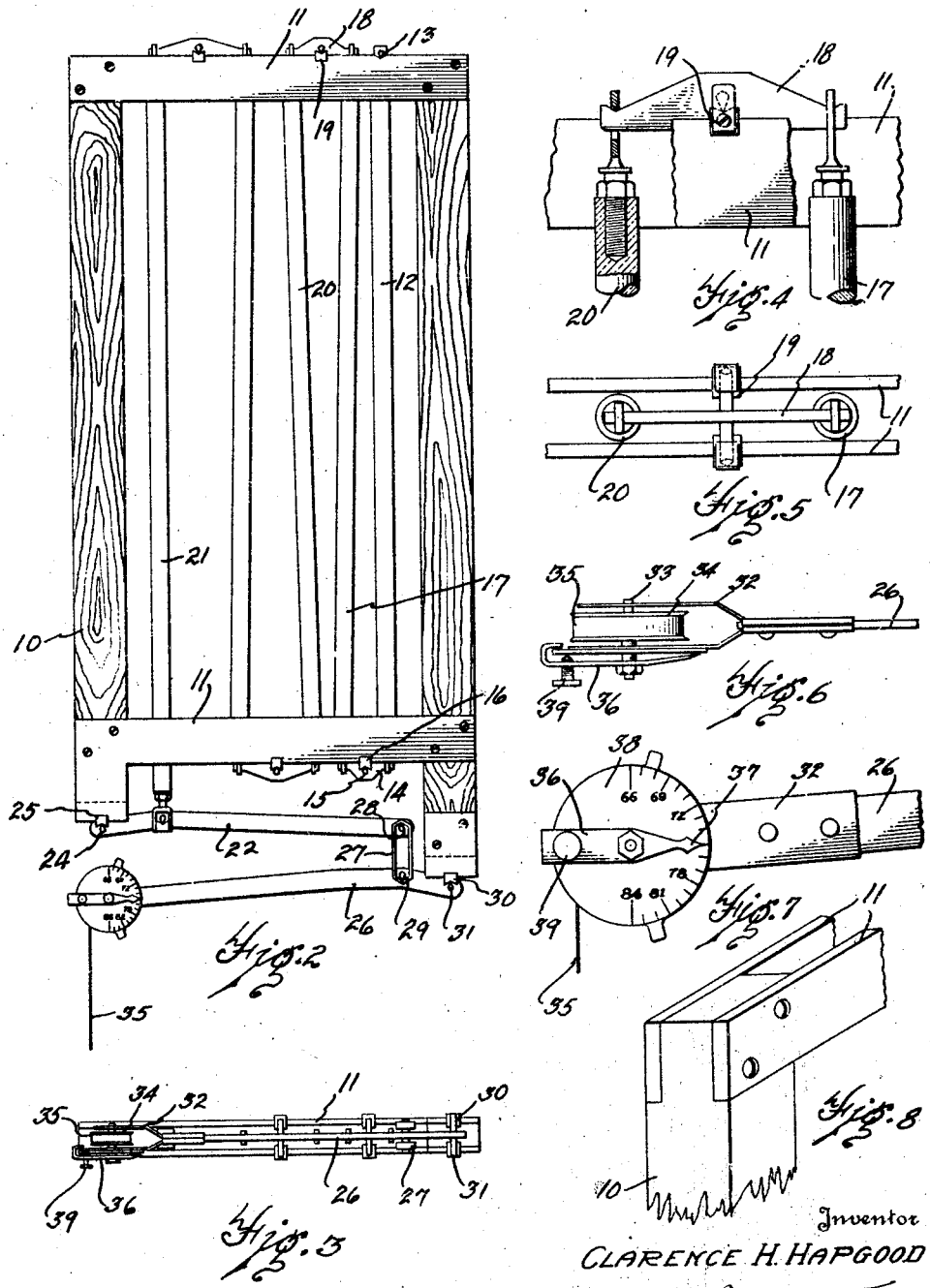
Inventor
CLARENCE H. HAPGOOD
By Rex Frye.
Attorney

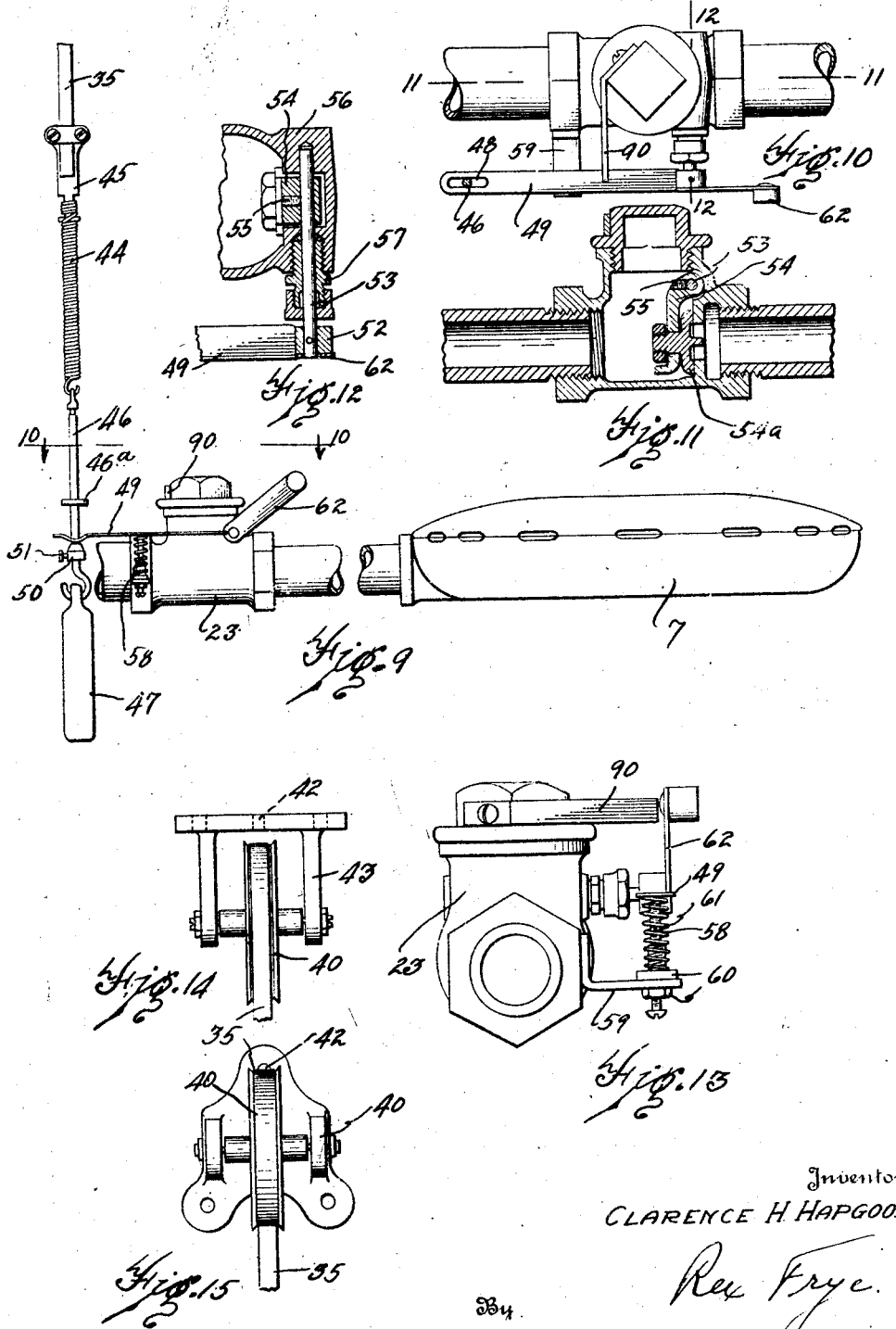

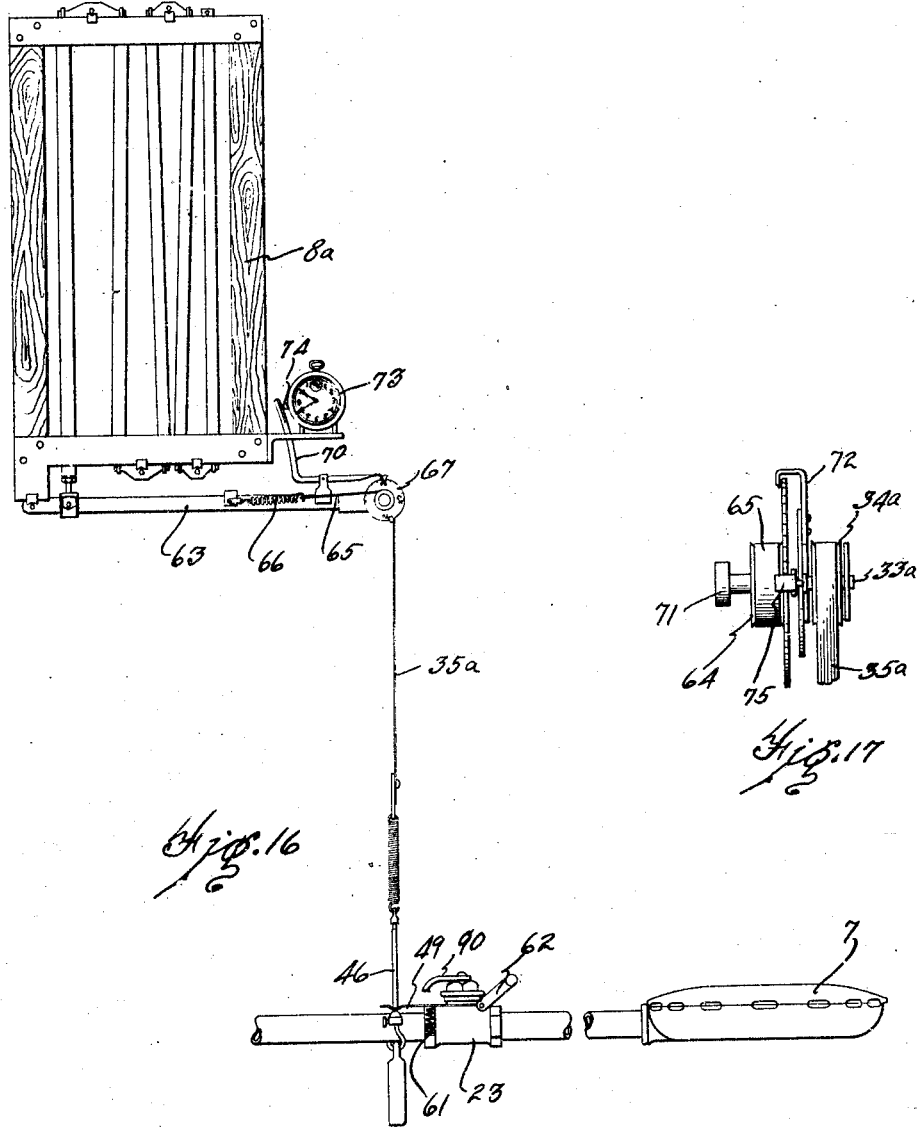

Aug. 21, 1928.
C. H. HAPGOOD
HEAT REGULATOR
Filed May 2, 1925
1,681,640
5 Sheets-Sheet 5
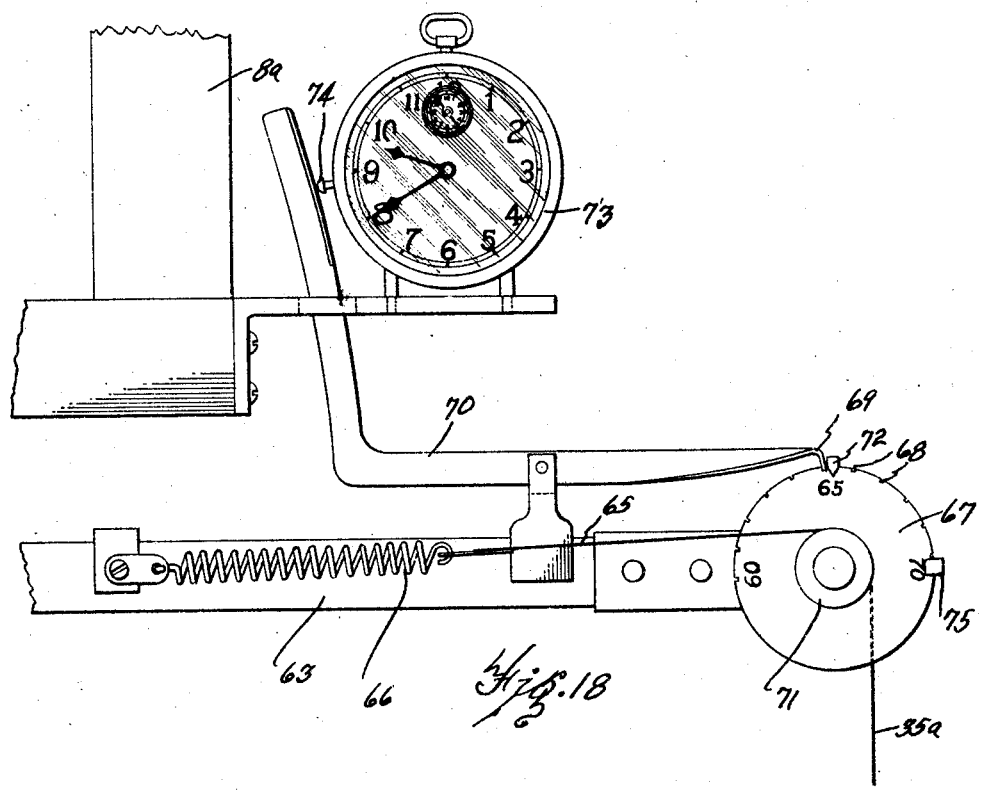
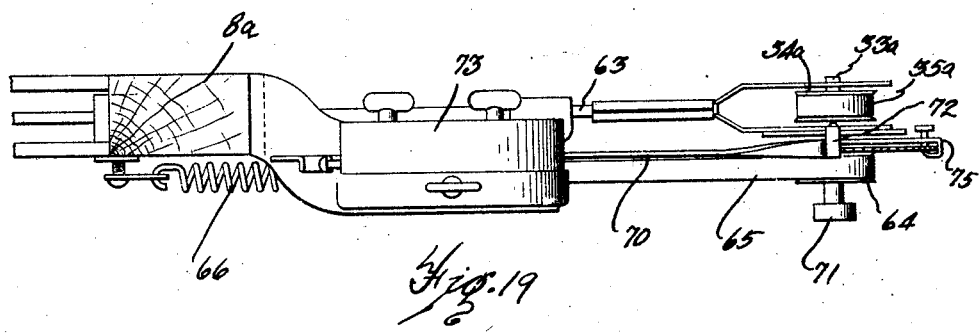
Inventor
CLARENCE H. HAPGOOD
By Rex Frye
Attorney Patented Aug. 21, 1928.

1,681,640

UNITED STATES PATENT OFFICE.

CLARENCE H. HAPGOOD, OF TOLEDO, OHIO, ASSIGNOR, BY MESNE ASSIGNMENTS, TO THE C. H. C. CO., OF TOLEDO, OHIO, A CORPORATION OF OHIO.

HEAT REGULATOR.

Application filed May 2, 1925. Serial No. 27,359.

This invention relates to automatic regulators for the heating devices of dwellings, factory buildings, boats and the like, whereby the interior of such dwellings, etc. may be maintained substantially at a predetermined temperature.

The principal object of my invention is the provision of a thermostatically controlled valve for the admission of fuel to the heating device employed, the thermostat being mounted at a distance from the valve, as, for example, in the living room of a dwelling.

Another object of my invention is the arrangement of the thermostatically controlled valve whereby it cannot be pulled open beyond the maximum position intended for the valve, even though the thermostat and control continue to move after the valve has reached its maximum position.

Another object of my invention is the arrangement of the thermostatic control whereby it will move the valve toward closed position until the valve reaches its maximum closed position wherein only sufficient fuel is permitted to pass to maintain a pilot light, and thereupon further movement of the thermostatic control will not effect further closing of the valve.

A further object of my invention is the provision of manually adjustable means for varying the extent of action of the thermostatic control, whereby various degrees of heat may be maintained in any desired location.

Other objects and advantages will be apparent from the following description, wherein reference is made to the accompanying drawings illustrating preferred embodiments of my invention and wherein similar reference numerals designate similar parts throughout the several views.

In the drawings:

Fig. 2 is an enlarged front elevation of the thermostat and associated elements.

Fig. 3 is a bottom plan view of the parts shown in Fig. 2.

Fig. 4 is an enlarged detail view showing the mounting of one of the levers connecting adjacent bars of the thermostat, parts being broken away and shown in section.

Fig. 5 is a plan view of the elements shown in Fig. 4.

Fig. 6 is a plan view and Fig. 7 a front elevation of the free extremity of the lower lever of the thermostat and the mechanism carried thereby for adjusting the position of the ribbon connecting the lever with the thermostatically controlled valve.

Fig. 8 is a detail perspective view of one of the corners of the thermostat frame.

Fig. 9 is an enlarged detail view of the thermostatically controlled valve and adjacent parts.

Fig. 10 is a plan view of the valve and control mechanism taken substantially on the line 10—10 of Fig. 9.

Fig. 11 is a vertical section taken substantially on the line 11—11 of Fig. 10.

Fig. 12 is a detail cross section taken substantially on the line 12—12 of Fig. 10.

Fig. 13 is an end view of the valve and associated mechanism shown in Fig. 10.

Fig. 14 is a side elevation and Fig. 15 a bottom plan view of one of the pulleys utilized for changing the angle of travel of the ribbon connecting the thermostat with the valve.

Fig. 16 is a side elevation of a slightly modified form of the thermostatic control mechanism and with a different adjusting means.

Fig. 17 is an end view of the lower lever of the thermostat shown in Fig. 16 with the adjusting drums mounted thereon.

Fig. 18 is an enlarged front elevation of the free extremity of the lower thermostat lever and associated elements, and Fig. 19 is a plan view of the parts shown in Fig. 18.

Figure 1:
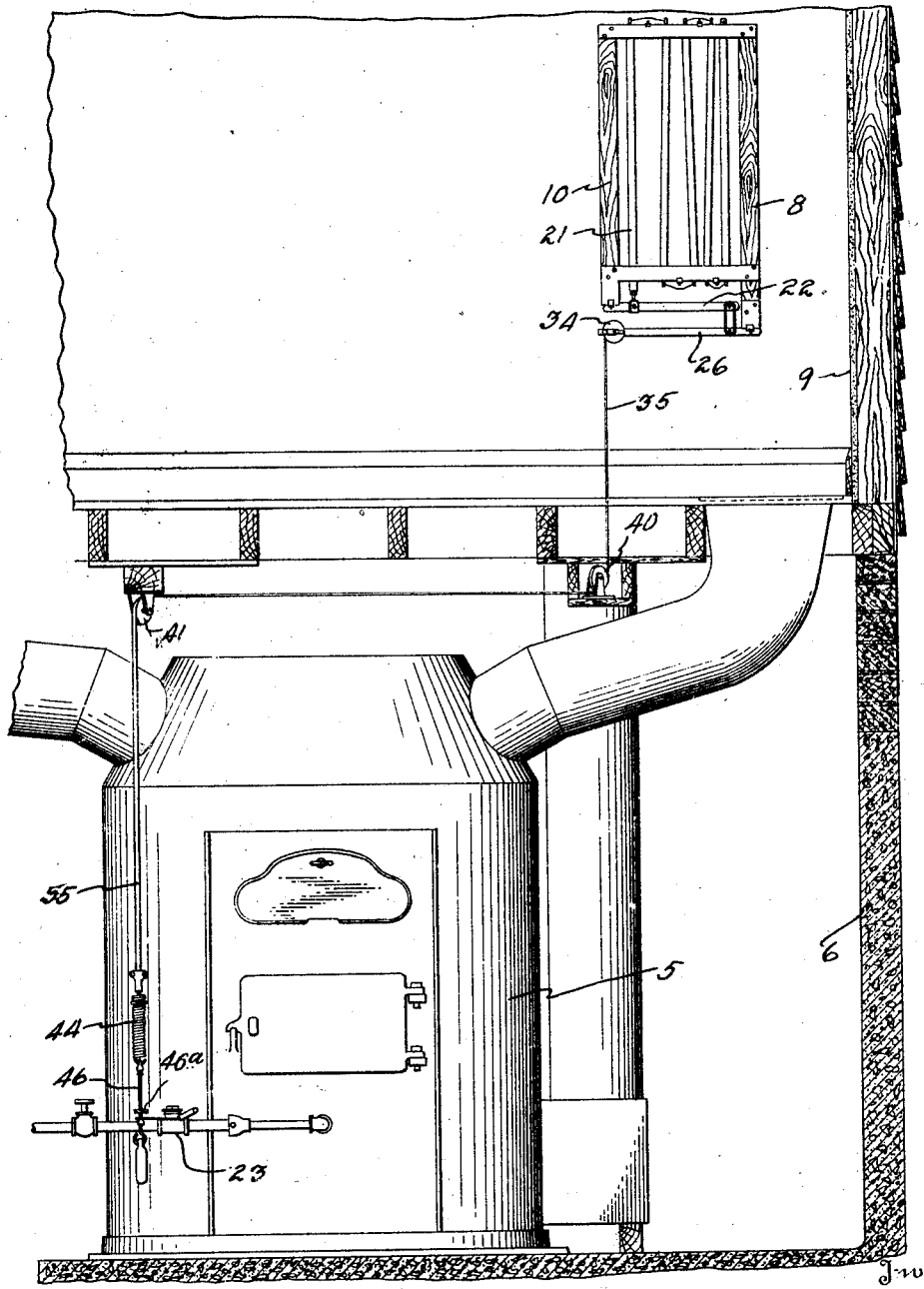
Fig. 1 is a front elevation of a furnace equipped with a thermostatically controlled device for heating the interior of a dwelling, parts being broken away and shown in section.

Referring now to the drawings, the numeral 5 designates a furnace of any desired size and contour used for heating the interior of buildings 6 and the like through the medium of a burner 7 adapted to burn gaseous or liquid fuel. In Fig. 1 is illustrated a furnace of the hot air type, but it is to be understood that my invention is adapted for use with other types of furnaces, stoves, etc., such as the usual hot water, steam or vapor systems. The heated air, hot water, etc. from the furnace is adapted to heat the various rooms of the building in the usual manner of heating devices, and the particular construction of the furnace, radiators, etc. forms no part of the present invention. A thermostat 8 is arranged in one or more of the rooms of the building to be heated, as for example in the living room 9 of a dwelling. As herein shown the thermostat comprises a frame having side pieces 10 of wood or other relatively non-expansible material and spaced cross bars 11 at the upper and lower extremities of the side pieces, as best shown in Figs. 2 and 8. The spaced cross bars 11 are utilized as supports for bearings for levers connecting the ends of adjacent sections of metallic rods or other relatively expansible materials forming the heat responsive elements of the thermostat. In the illustrated embodiment one of the metallic rods 12 is pivoted adjacent at its upper extremity by means of a knife edge pivot bearing upon the upper faces of the spaced upper cross bars 11, and extends downward in a substantially vertical direction to the lower extremity of the thermostat frame, where its lower extremity is connected to one arm of the connecting lever 14. The lever 14 is fulcrumed intermediate its ends by means of the knife edge pivot 15 upon a spaced bearing 16 secured upon the lower extremities of the lower cross bars 11, and its other arm is connected to the lower extremity of the expansible metallic rod 17, which extends upwardly from the lever 14 to the upper extremity of the thermostat frame, where it is connected with the lever 18 fulcrumed intermediate its ends upon bearings 19 carried by the upper cross bars 11. It will thus be seen that the expansion or contraction of the metallic rod 12 will serve to swing the lever 14 on its pivot and such motion will be transmitted to the metallic rod 17. In addition this rod 17 will expand or contract simultaneously with the rod 12, with the result that substantially twice as much movement will be imparted to the lever 18 connecting the upper extremity of the rod 17 with the next adjacent rod 20. As many metallic rods may be arranged with their extremities connected by levers fulcrumed on the cross bars 11 as may be found necessary to impart sufficient movement to the endmost rod 21 to swing the multiplying lever 22 a sufficient distance to operate the thermotsatically controlled valve 23 when the temperature in the room varies a sufficient number of degrees. Preferably I desire the thermostat to be responsive to relatively small changes in temperature, as for example changes of five to ten degrees, and I have found in practice that this result is accomplished by means of a thermostat constructed substantially in accordance with that illustrated in Figs. 1 and 2. It will be understood that the metallic rods of the thermostat may be formed of more than one material, or may be relatively thin ribbons or wires. This term is meant to include any metallic heat responsive element or combination of elements which will expand and contract during changes in the temperature of the surrounding atmosphere and transmit their collective movement to the multiplying lever 22. As best shown in Fig. 2 the multiplying lever 22 is fulcrumed adjacent one extremity by means of an inverted knife edge pivot 24 engaging the bearing 25 carried by the lower cross bars 11, and is connected intermediate its ends to the lower extremity of the metallic rod 21. Preferably the connection of the rod 21 with the multiplying lever 22 is comparatively close to the fulcrum pivot 24 of said lever and relatively distant from the free extremity of the lever, whereby a relatively great multiplication is effected. Moreover, to increase the multiplication to any desired extent, I preferably connect the free end of the lever 22 with a lower multiplying lever 26 by means of a link 27 engaging knife edge pivots 28 and 29 on the upper and lower multiplying levers respectively. The lower multiplying lever 26 is fulcrumed adjacent one extermity upon the bearing 30 carried upon the lower extermity of one side piece 10 of the thermostat frame, and the pivot 29 is preferably placed comparatively close to the fulcrum pivot 31 and relatively far from the free extremity of the lower multiplying lever. By properly positioning the intermediate pivots on the multiplying levers 22 and 26 any desired degree of multiplication can be obtained, whereby a relatively small movement of the thermostat rods will impart a relatively great movement to the free extremity of the lower multiplying lever 26. Upon the free extremity of the lower multiplying lever 26 is arranged a pair of spaced bracket arms 32 (note Fig. 6) in which is journaled the shaft 33 of an adjusting roller 34 to the periphery of which is secured the upper extremity of the ribbon 35 connecting the multiplying lever 26 with the thermostatically controlled valve 23. Preferably the ribbon 35 extends over the major portion of the periphery of the roller 34 and is secured thereto at its extremity, whereby rotation of the roller 34 in the proper direction will shorten or lengthen the effective length of the ribbon between the roller 34 and the controlling lever of the valve 23. Means for rotating the roller 34 to effect desired adjustments is best shown in Figs. 6 and 7. An adjusting arm 36 is fixed upon one extremity of the shaft 33 and carries a pointer 37 movable over a graduated plate 38 fixed upon one of the bracket arms 32. Rotation of the bracket arm 36 in either direction will move the pointer over the graduations on the plate 38 and simultaneously rotate the roller 34 to change the effective length of the ribfixed upon the bracket arm 32 of the lower multiplying lever with the pointer 37 of the adjusting arm 36 registering with the temperature maintained in the room. For purposes of example we will say that this temperature is seventy-five degrees F. Accordingly the position assumed by the pointer 37 and graduated plate 38 will be that shown in Fig. 7. The temperature of the room will now be automatically maintained at substantially this temperature. Whenever the temperature rises above the desired maximum the metallic bars of the thermostat will expand and their aggregate movement will be multiplied through the levers 22 and 26 and then imparted to the ribbon 35 to lower the hook 46 and its contact collar 50, a second collar member 46$^a$ on the hook 46 then engaging the lever arm 49 of the valve to swing it downwardly a distance proportional to the descent of the hook 46 to partially close the valve 54. This lessens the amount of fuel admitted to the burner 7 and so causes a lesser amount of heat to be transmitted to the room 9. Thereupon the temperature of the room will gradually lower, and in so doing will cause the metallic bars of the thermostat to again contact to effect a lifting movement upon the contact collar 10. This alternate lifting and lowering of the contact collar 50 to swing the lever arm 49 of the valve to open or close the valve 54 will serve to keep the temperature in the room 9 very close to the desired temperature indicated on the graduated plate 38. Should a different temperature be desired within the room 9, the adjusting arm 36 is turned in the proper direction to bring its pointer 37 into registration with the desired new temperature, and then locked in the new position by means of the set screw 39. This movement of the adjusting arm 36 changes the effective length of the ribbon 35, as hereinbefore described, and thus changes the height of the contact collar 50. The collar 50 may also be adjusted upon the shank of the hook 46 so as to make corrections for any accidental changes in length of the ribbon, wear upon the pivots of the thermostat levers, etc.

After the contraction of the thermostat so shortens the effective length of the ribbon that the collar 50 swings the lever arm 49 to the maximum height permitted, the stop member 90 secured on the valve casing will prevent further movement of the lever arm, but further movement of the ribbon 35 is permitted because the spring 44 will stretch to accommodate the additional ribbon travel.

In Figs. 16—19 I have shown a slightly modified embodiment of my invention wherein a single multiplying lever 63 is arranged to be moved by the collective movement of the thermostat 8$^a$, and a different form of adjustment for the effective length of the ribbon 35$^a$ is provided. As best shown in Figs. 17 and 19 a second adjustment roller 64 is mounted on the same shaft 33$^a$ that carries the adjusting roller 34$^a$ to which the upper extremity of the ribbon 35$^a$ is secure, and upon the adjusting roller 64 is secured one extremity of a metallic adjusting ribbon 65, the opposite extremity of which is secured to a coil spring 66. The ribbon 65 is preferably wound around the major portion of the periphery of the roller 64 so that movement of the ribbon 65 will serve to rotate the roller 64. The graduated disc 67 is also fixed upon the shaft 33$^a$ and carries in its periphery a series of notches 68 adapted to receive the down turned extremity 69 of the locking lever 70 whereby any desired adjustment of the effective length of the ribbon 35$^a$ may be maintained. A knob 71 is also secured upon the shaft 33$^a$ to permit manual rotation of the shaft and attached members to change the adjustment of the ribbon 35$^a$ whenever desired. Thus, when it is desired to change the adjustment so that the temperature of the room will be maintained at say sixty-five degrees instead of at say seventy degrees, the knob 71 is grasped in one hand and the end 69 of the locking lever 70 lifted with the other hand to free it from the peripheral notches of the disc 67. The knob and disc are now rotated in the proper direction until the numeral 65 registers with a fixed indicator 72, whereupon the projecting end 69 of the locking lever is permitted to fall into the proper peripheral notch 68 on the disc 67. During the rotation of the knob 71 the ribbon 65 has been wound upon the periphery of the roller 64 against the tension of the coil spring 66, so that the spring remains under tension as long as the disc 67 and associated parts are maintained in the new position.

Means are also provided for automatically changing the temperature back to say seventy degrees at any desired time of the day. This is particularly useful when it is desired to maintain a relatively low temperature throughout the building at night and then raise the temperature of the building before the occupants thereof arise. To accomplish this the alarm clock 73 is arranged with its clapper 74 in contact with one arm of the locking lever 70 (Note Fig. 18), and set so that the alarm mechanism will operate to oscillate the clapper at the desired time for the change of temperature within the dwelling. When the alarm mechanism goes off, the oscillating clapper will alternately raise and lower the downwardly projecting extremity 69 of the locking lever to first lift such projecting end from the peripheral notch 68 wherein it had been seated and then permit it to rest upon the bon 35. A set screw 39 is arranged between the bracket arm 36 and plate 38 to lock the arm in any adjusted position The ribbon 35 is adapted to pass from the adjusting roller 34 carried by the thermostat lever 26 to adjacent the valve 23. As illustrated in Fig. 1, one or more pulleys may be utilized to change the direction of movement of the ribbon 35 as needed to permit the lower extremity of the ribbon 35 to hang plumb adjacent the valve 23. In the illustrated embodiment one pulley 40 is arranged to change the direction of movement of the ribbon 35 from the vertical to the horizontal, and another pulley 41 is arranged to again change the movement from the horizontal to the vertical. It will be understood that this showing is only for purposes of exemplification, and that as many pulleys may be utilized as are necessary. One of these pulleys is illustrated in Figs. 14 and 15, and it will be noted that the ribbon 35 is arranged so that it engages or leaves the pulley in direct alignment with one of the openings 42 whereby the pulley bracket 43 is secured to the joists of the building or other supporting members. By virtue of this construction the pulley can also be utilized to change the angular travel of the ribbon 35 while maintaining the ribbon in firm engagement with the periphery of the roller. Thus, when the opening 42 is arranged in direct alignment with the ribbon 35, the pulley bracket 43 can be swung on the securing member passing through the opening 42 as a center to change the angular travel of the ribbon as it passes from the pulley. When the desired angle has been secured additional securing members are then fastened through the remaining openings in the pulley bracket.

The lower extremity of the ribbon 35 is secured to a coil spring 44, as by the clamp 45 (note Fig. 9), and to the lower extremity of the spring 44 is suspended a hook 46 adapted to carry a removable weight 47 whereby the lower extremity of the ribbon 35 is maintained in a taut vertical position and a pull exerted upon the entire effective length of the ribbon to take up any slackness that may be caused therein by the downward movement of the free extremity of the multiplying lever 26. The shank of the hook 47 passes through an elongated slot 48 in the valve actuating lever arm 49 (note Fig. 10), and a collar 50 is adjustably secured upon said shank, as by the set screw 51, to contact the lower face of the arm 49 whenever the movement of the ribbon 35 under the control of the thermostat brings the collar into engagement with the lever arm. The lever arm 49 extends radially from a collar or hub portion 52 pinned or otherwise secured upon the shaft 53 to which is also secured the valve 54, as by the set screw 55. The shaft 53 is preferably journaled at one extremity in the valve casing 56 (note Fig. 12), and extends through a stuffing box 57 threaded into the valve casing to prevent the leakage of gas or other material passing through the valve casing. The valve 54 is herein shown as comprising a body member depending from the shaft 53 and carrying a seat engaging portion 54$^a$ so that the position of the seat engaging portion relatively to the body portion of the valve may be adjusted at will. It will be understood, however, that other forms of valve constructions are useful with my invention. I preferably provide a stop member 58 (note Figs. 9 and 13) to limit the downward swinging movement of the lever arm 49 so that the valve 54 cannot completely close, even when the contact collar 50 moves below the lever arm 49 because of the expansive movements of the thermostat. As herein shown the stop member 58 is threaded into a bracket 59 extending laterally from the valve casing, lock nuts 60 being arranged to lock the stop member in any adjusted position. Accordingly, the position of the stop member may be set so as to permit the ingress of sufficient gas or other fuel through the valve 54 to maintain a pilot light adjacent the burner 7 when the lever arm 49 rests upon the upper extremity of the stop member 58. A coil spring 61 may also be arranged around the stop member 58 to cushion the lever arm and valve and also impart an initial impetus to the valve arm when contacted by the collar 50 during the upward movement of the control mechanism because of contraction of the thermostat. A weighted arm 62 may also be arranged on the valve shaft 53 to counteract the weight of the lever arm 49 and maintain the valve assembly in substantially balanced position, whereby a very slight movement of the control mechanism is needed to move the valve in either direction.

The operation of my improved mechanism is believed to be apparent. The thermostat 8 is situated in any desired room of a dwelling and may be covered, if desired, by a porous screen or grating. The temperature of the room will thereupon determine the amount of fuel admitted through the valve 23 to the burner 7 in the furnace 5. To accomplish this the thermostat is connected with the valve through the multiplying levers 22 and 26, ribbon 35 and weighted hook 46 carrying the collar 50 adapted to engage the lever arm 49 of the valve. Preliminarily the effective length of the ribbon 35 is adjusted so that the valve will admit sufficient fuel to maintain the air in the room 9 substantially at a predetermined temperature. This adjustment can be effected either by means of the clamp 45 or the adjusting roller 34. The graduated plate 38 is then periphery of the disc 67. When the projecting end of the locking lever is released from its peripheral notch 68 the spring 66 will be relieved from its tension and contract. In so doing it will unwind the ribbon 65 from the roller 64 and turn such roller and the shaft 33ᵃ upon which it is fixed until some stop is engaged to prevent further movement of the shaft 33ᵃ and its attached elements. I preferably provide such stop by fixing upon the outer edge of the disc 67 an adjustable stop member 75 which is clamped at the registration on the disc 67 corresponding to the temperature which it is desired for the interior of the dwelling during the day. In Fig. 18 this stop member 75 has been clamped upon the disc 67 in registration with the indication 70° thereon, and accordingly, the turning movement of the shaft 33ᵃ and associated parts will be stopped whenever the clamp 75 engages against the permanently fixed stop member 72, in which position the ribbon 35ᵃ is adjusted to maintain the temperature within the building at seventy degrees. By altering the position of the adjustable stop 75 any desired temperature can be maintained within the building after the alarm clock has acted to lift the locking lever 70 from its engagement with the peripheral notch 68 in which it has previously been seated. This provides a very simple and effective means of maintaining one temperature at night and another during the day, and it is only necessary to manually rotate the knob 71 to bring the desired peripheral notch 68 below the projecting end 69 in the locking lever and wind the alarm clock when the lowering of the temperature is desired.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, and a weighted contact member carried by the flexible member and extending through the slot of said operating arm, whereby the contact member and operating arm will be moved to vary the position of the valve in accordance with the alterations of length of the thermostat.

2. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, and an adjustable collar on the weighted member arranged to contact the lower face of the operating arm, whereby the contact member and operating arm will be moved to vary the position of the valve in accordance with the alterations of length of the thermostat.

3. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, whereby the contact member and operating arm will be moved to vary the position of the valve in accordance with the alterations of length of the thermostat, and means for adjusting the effective length of the flexible member.

4. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, whereby the contact member and operating arm will be moved to vary the position of the valve in accordance with the alterations of length of the thermostat, and means carried by the multiplying lever for adjusting the effective length of the flexible member.

5. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, whereby the contact member and operating arm will be moved to vary the position of the valve in accordance with the alterations of length of the thermostat, means carried by the multiplying lever for adjusting the effective length of the flexible member including a roller journaled on the lever and secured at its periphery to the flexible member, and means for rotating the roller to wind or unwind the flexible member on the periphery of the roller.

6. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, and a weighted contact member carried by the flexible member and extending through the slot of said operating arm, whereby the contact member and operating arm will be moved to vary the position of the valve in accordance with the alterations of length of the thermostat, there being a coil spring interposed in the flexible member between the multiplying lever and weighted contact member.

7. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, whereby the contact member and operating arm will be moved to vary the position of the valve in accordance with the alterations of length of the thermostat, and means for limiting the movement of the operating arm in either direction.

8. A heat regulator for buildings including a burner, a valve arranged to control the admission of fuel to the burner, an operating arm secured adjacent one extremity to the valve and having a slot in its free extremity, a thermostat, a multiplying lever mounted to be actuated thereby, a flexible member suspended from the lever, a weighted contact member carried by the flexible member and extending through the slot of said operating arm, whereby the contact member and operating arm will be moved to vary the position of the valve in accordance with the alterations of length of the thermostat, and a pair of stop members carried by the valve in position to limit the movement of the operating arm in either direction.

9. A heat regulator for buildings including a burner, a valve arranged to control the admission of fuel to the burner, a thermostat mounted at a distance from the burner and comprising a plurality of metallic bars and pivoted levers connecting the ends of adjacent bars to transmit the expansive or contractive movements of one bar to the next, a multiplying lever arranged to be actuated by the metallic bars of the thermostat, a second multiplying lever having an inverted pivot fulcrumed upon the frame, connections between the multiplying levers, and a flexible member connecting the second multiplying lever with the valve to vary the position of the valve in accordance with the alterations of length of the thermostat.

10. A heat regulator for buildings including a burner, a valve arranged to control the admission of fuel to the burner, a thermostat mounted at a distance from the burner and comprising a plurality of metallic bars and pivoted levers connecting the ends of adjacent bars to transmit the expansive or contractive movements of one bar to the next, a multiplying lever arranged to be actuated by the metallic bars of the thermostat, a second multiplying lever having an inverted pivot fulcrumed upon the frame, connections between the multiplying levers, a flexible member connecting the second multiplying lever with the valve to vary the position of the valve in accordance with the alterations of length of the thermostat, and means mounted upon the second multiplying lever for adjusting the effective length of the flexible member.

11. A heat regulator for buildings including a burner, a valve arranged to control the admission of fuel to the burner, a thermostat mounted at a distance from the burner and comprising a plurality of metallic bars and pivoted levers connecting the ends of adjacent bars to transmit the expansive or contractive movements of one bar to the next, a multiplying lever arranged to be actuated by the metallic bars of the thermostat, a second multiplying lever having an inverted pivot fulcrumed upon the frame, connections between the multiplying levers, a flexible member connecting the second multiplying lever with the valve to vary the position of the valve in accordance with the alterations of length of the thermostat; means mounted upon the second multiplying lever for adjusting the effective length of the flexible member including a roller journaled upon the free extremity of said lever and connected at its periphery with the flexible member, and means for rotating the roller to wind or unwind the flexible member upon the roller.

12. A heat regulator for buildings including a burner, a valve arranged to control the admission of fuel to the burner and having an operating arm, a thermostat, a multiplying lever mounted to be actuated thereby, a flexible member arranged between the lever and the operating arm of the valve, and means for varying the effective length of the flexible member including a roller journaled upon the lever and connected at its periphery to the flexible member, means for rotating the roller, in-